UNITED STATES PATENT OFFICE.

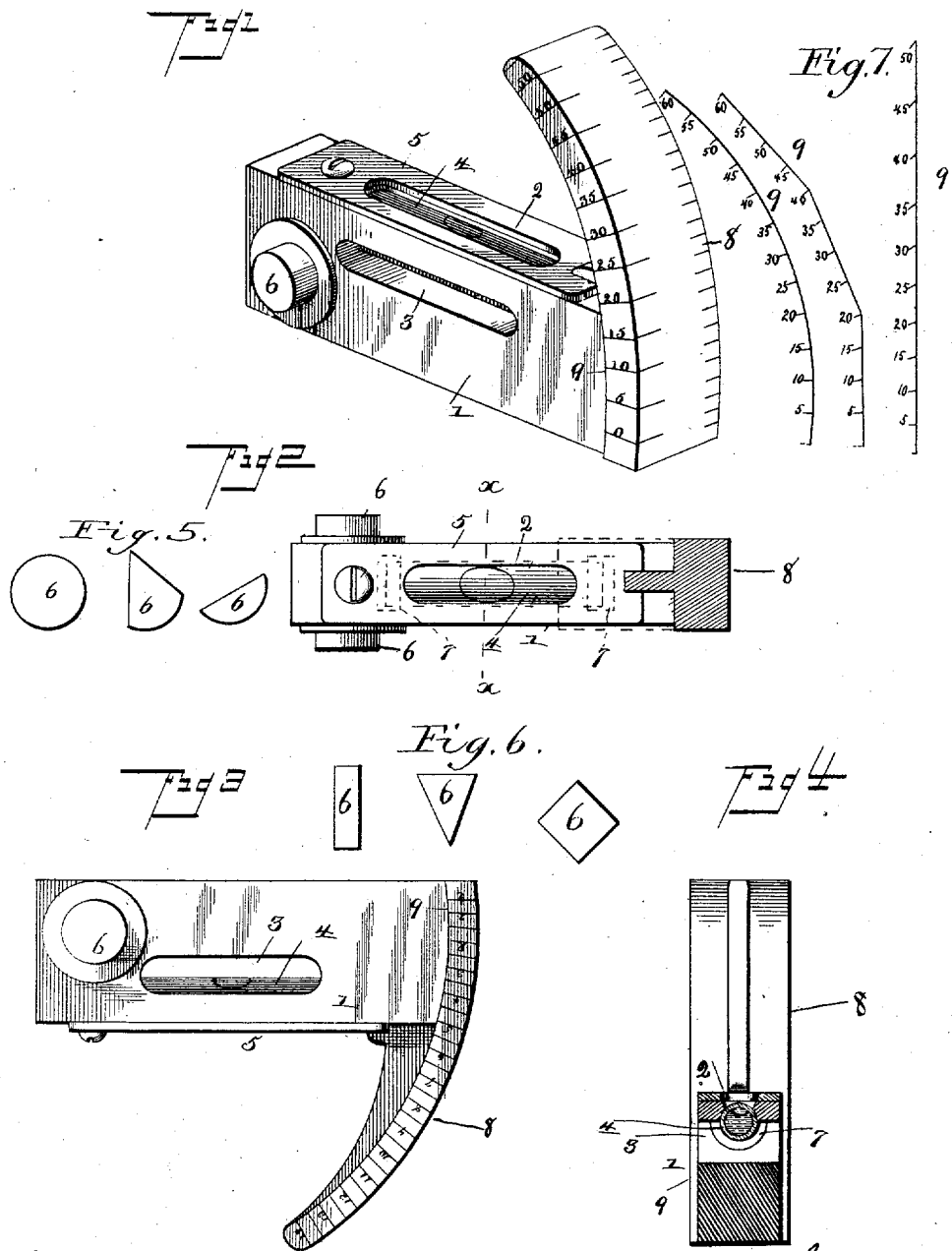

JOSEPH BRAKELEY, OF FORKS OF BUFFALO, VIRGINIA.

SPIRIT-LEVEL.

SPECIFICATION forming part of Letters Patent No. 414,372, dated November 5, 1889.

Application filed May 28, 1889. Serial No. 312,412. (No model.)

*To all whom it may concern:*

Be it known that I, JOSEPH BRAKELEY, a citizen of the United States, residing at Forks of Buffalo, in the county of Amherst and State of Virginia, have invented a new and useful Spirit-Level Device, of which the following is a specification.

My invention relates to improvements in the class of spirit-levels usually used by mechanics, to be operated in conjunction with a common mechanic's square; and the objects of my improvements are to provide an inexpensive device for conveniently and accurately measuring the angle of inclination of unlevel surfaces. I attain these objects by the mechanism illustrated in the accompanying drawings, in which—

Figure 1 is a perspective view of the entire device; Fig. 2, a top view with the arm 8 in section; Fig. 3, a side view of the device inverted. Fig. 4 is a sectional view of the device on the line $x$ $x$, Fig. 2. Fig. 5 is a detail view of the boss 6 in various forms of a circular type. Fig. 6 shows various views of boss 6 of an angular type, and Fig. 7 is to illustrate various forms of the graduated scale 9.

Similar numerals refer to similar parts throughout the several views.

The device consists of a stock 1, made of cast metal or any other suitable material, having at one end, on one or both sides, a small projection, which I term a "boss," 6, on which to rotate the device, and which may be of any form suitable for that purpose—that is, it may have a circular bearing, as illustrated on Fig. 5, or an angular bearing, as illustrated on Fig. 6. I prefer the circular type because with it the device would be more durable than with the angular forms. At the opposite end of the stock 1, I form an arm 8, as a part thereof, and shaping it suitably for the reception of a graduated scale 9, by which to register the dimensions of the angle to be measured. It may be ranged on a strait, curved, or polygonal line, as illustrated on Fig. 7. I prefer a curved form, because with it the device is more compact than with other forms. The graduations of the scale 9 are placed in lines tangential to the boss 6, and may be either in lineal measure or degrees of a circle, or both. I prefer a boss and a graduated scale placed on each side of the device to facilitate reading the measurement in contracted locations. From zero to sixty degrees, or its equivalent in lineal measure, is amply sufficient range of scale for all practical purposes. About central, on top, the stock is slotted suitably for the reception of a spirit-level 4, which is secured in place by means of suitable cement 7 at both ends, and covered on top by a plate 5. I form sight-slots both over and under the spirit-level, as shown at 2 and 3, respectively, so that its reading may be seen both when the device is in its normal position, Fig. 2, and when inverted, Fig. 3.

To operate this device, I place a square on the surface to be examined. Then, with one of the bosses of the device resting on the square, I rotate it into a level position and note the degree that registers with the edge of the square, which will be the correct measurement of the angle sought.

To measure an angle on an overhead surface, (as a ceiling or rafter in a building, for instance,) I place the square against it on the under side, invert the device Fig. 3, and proceed as in the first instance above described; and to measure the inclination of a comparatively-vertical object, (as the side of a building, for instance,) I place one leg of the square against the object and apply the device to the other leg and proceed as in the first instance also. If the angle to be measured exceeds sixty degrees, or the range of the scale on the device, I reverse it, (the device.) By this means it is adapted to measuring any angle that may be desired.

Some of the advantages of this device are: its compactness, by which a large radius may be used in constructing the scale without unduly increasing the size of the device, and allows wide spaces between the markings on the scale, thus greatly reducing the liability to inaccuracy in reading it; also, its extreme simplicity, there being no working-joints to be kept in order, and its cheapness to manufacture, and its adaptability to contracted locations.

I do not confine myself to this particular form of stock or other minor details, but reserve the right to modify them within the range of the mechanical skill of persons skilled in the branch of manufacture to which this device belongs without departing from the spirit of my invention.

I am aware that prior to my invention leveling devices have been made with a graduated scale operating in conjunction with a spirit-level. I therefore do not claim that combination, broadly; but What I do claim as my invention, and desire to secure by Letters Patent, is—

In a spirit-level, the stock 1, having the spirit-bubble 4 therein and provided with the circular or angular boss 6 at one end, in combination with the graduated line 9, fixed at the other end of the stock, the graduations being in lines tangential to the said circular or angular boss 6, all substantially as set forth in the foregoing specification.

JOSEPH BRAKELEY.

Witnesses:
JEROME HINGERTY,
JAMES MAHON.